G. Guenther. Sheet 1, 2 Sheets.

Glue-Drying Apparatus.

No. 3,129. Reissued Sept. 22, 1868.

WITNESSES:
W. A. Dey
C. C. Livingst

INVENTOR:
Geo Guenther
by his Attorney
J. S. Sutton

Sheet 2, 2 Sheets.

G. Guenther.

Glue-Drying Apparatus.

No. 3,129. Reissued Sept. 22, 1868.

WITNESSES:

W. E. Dey

C. C. Livings

INVENTOR:

Geo. Guenther by his Attorneys

J. A. Nelson

UNITED STATES PATENT OFFICE.

GEORGE GUENTHER, OF CHICAGO, ILLINOIS.

IMPROVED MODE OF DRYING GLUE.

Specification forming part of Letters Patent No. 65,377, dated June 4, 1867; Reissue No. 2,971, dated June 9, 1868; Reissue No. 3,129, dated September 22, 1868.

*To all whom it may concern:*

Be in known that I, GEORGE GUENTHER, of the city of Chicago, county of Cook, and State of Illinois, have invented a certain new and useful Mode of Drying Glue; and I do hereby declare that the following is a full, clear, and exact description thereof, reference being had to the accompanying drawings, making a part of this specification, in which—

Figure 6:
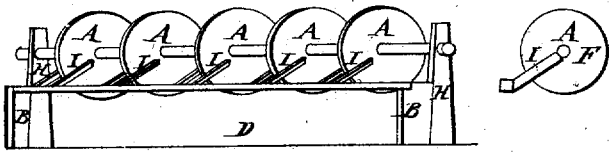
Figure 1:
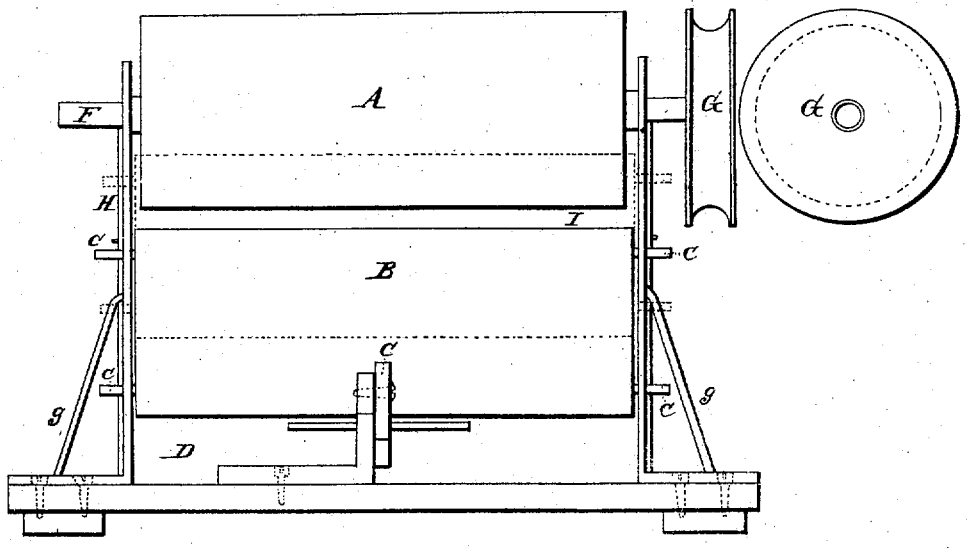
Figure 2:
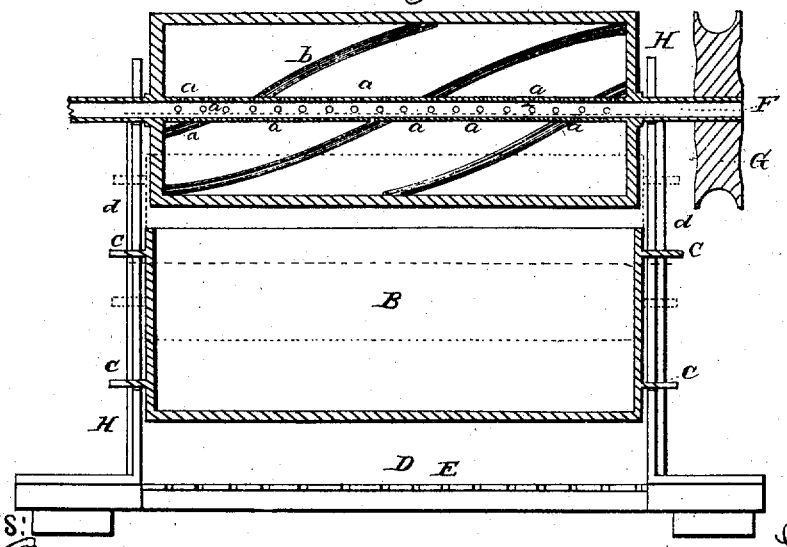
Figure 5:
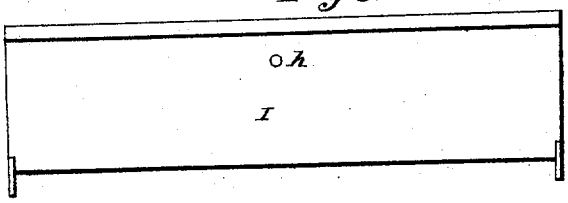
Figure 3:
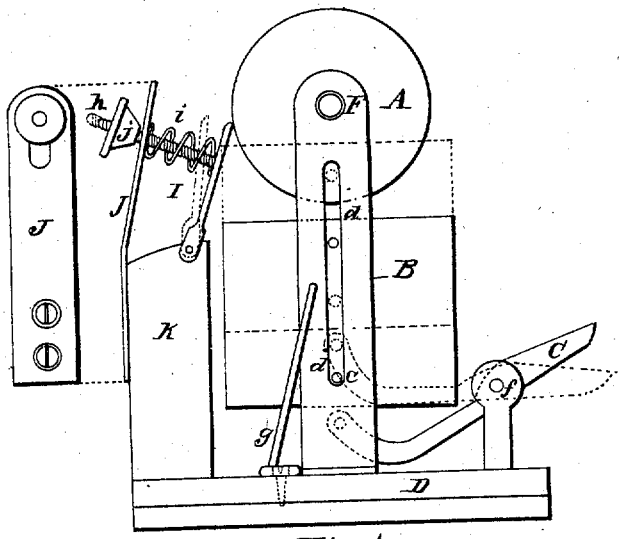
Figure 4:
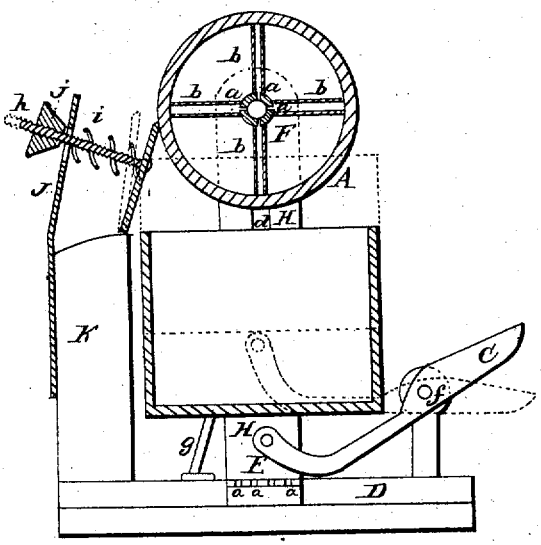

Figure 1 is a front elevation; Fig. 2, a vertical longitudinal section; Fig. 3, an end view; Fig. 4, a transverse vertical section; Fig. 5, a view of the scraper detached; Figs. 6 and 7, a view of a modification of the cylinder.

Like letters refer to similar parts in all of the figures.

My invention relates to the mode of drying glue in thin scales upon solid surfaces by the use of steam applied internally or hot air externally, or both, as is hereinafter set forth. Heretofore it has been usually dried upon netting by the simple action of the atmosphere, which at the best is slow, and in damp or rainy weather exceedingly difficult, while a high degree of heat has been found injurious to the glue. By my mode I avoid these difficulties and can produce a superior article in all conditions of the weather.

To enable others skilled in the art to make the necessary or desirable machinery to dry glue by my mode, I will proceed to describe its construction and operation.

As the dimensions may all be varied without changing the principle or operation of the machinery, a description or detail will not be necessary. A convenient size will be found by making the cylinder A about six feet long and two feet in diameter, with corresponding proportions in the other parts.

The cylinder A is attached to the shaft F by ordinary heads or crown-sheets when used with steam, but will not need to be so constructed as to withstand a high pressure, as but a little higher pressure than atmospheric steam will be required. Much higher would increase the temperature of the cylinder so as to injure the glue. Steam is admitted through the shaft F, which is made hollow for that purpose, and passes out the shaft by the holes or perforations *a*. The interior of the cylinder is provided with spiral ducts or guides *b*, which carry the water of condensation to the center and discharge it through the opposite end of the shaft. The exterior is made smooth, and if made of cast-iron turned off, and when made of cast-iron it will be found convenient in casting to make them shorter than the length represented. This cylinder is supported by the posts or standards H and revolved by the pulley-wheel G, or by other suitable or convenient means.

Directly below the cylinder I place a trough, B, in which the glue-liquid is placed. This trough is supported in place by the bolts or pins *c*, which pass through the slot or mortise *d* of the post H, and is raised so that its contents will be brought in contact with the cylinder by the treadle C. This trough will be made in any convenient form. The treadle C is pivoted at *f* to a post or standard, which, like the posts H, is firmly attached to the base or foundation D.

At the back of the machine I attach a scraper, I, to the post K or other suitable attachment, which scraper is provided with a sharp edge, which is brought to bear against the cylinder by a spring, *i*, which spring rests against the scraper and against the bar J, and is held in place by the rod or bar *h*. This rod is provided with a thumb-screw to hold the scraper back while the cylinder is taking on glue-liquid and while it is being dried. Where the scraper is of any considerable length, more than one of these rods and springs will be necessary.

When hot air is to be used either alone or in conjunction with steam, I provide for its introduction by a perforated plate or register, E, placed in the base D or in the floor of the building, and in that case I mount the trough upon trucks or wheels, so that it can be removed as soon as a sufficient amount of stock is taken on by the cylinder, so that its action upon the cylinder will be direct from the register. The judgment of the glue-manufacturer should of course be exercised to avoid too high or too low a temperature. Hot air may also be driven through the cylinders in place of steam.

Figs. 6 and 7 show a modification of the cylinder and scraper. As shown there, the cylinder, instead of being made perfect, is made of a series of disks attached to the shaft, which gives more surface for drying purposes than the plain cylinder. In case steam is used with them, they will be made hollow, and the ducts for the water of condensation placed on the sides or heads; if hot air only, then they may be made of solid plates. The scrapers will necessarily be made so as to take the sides as well as the periphery.

In operation, when the revolving part is put in motion, the trough is elevated so that it will dip, and it is held there until a sufficient quantity of glue-liquid is taken on, when it is lowered or removed. The rotation continues until the glue is sufficiently dried, when the scraper I is applied and it is taken off. The scraper is then withdrawn and the operation repeated.

It will be found by testing this method that glue can be dried without injury with much greater rapidity and facility than by any of the modes heretofore in use.

Some of the advantages due to certain features and stages of my invention may be separately enumerated as follows: First, by reason of the fact that I expose the glue on surfaces, which are dipped therein and the thin glue then allowed to dry thereon, I am able to manufacture the glue in thin scales or flakes, which will melt almost immediately on being stirred into warm water; second, by reason of the fact that I expose the glue under these conditions to circulating currents of air received through the perforated base E, I am able to dry the flakes from the outside and thus to effect the operation more rapidly; third, by reason of the fact that I apply artificial heat in proper quantities, I am able to still further facilitate and expedite the process of drying the thin flakes; fourth, by reason of the fact that the surfaces on which my glue is dried are rotated as well as heated to as high a temperature as is consistent with the material being treated, I am able to guard in part at least against the tendency of the semi-fluid material to move by gravity on the plates prior to its hardening and to induce it to dry more evenly as well as rapidly; fifth, by reason of the fact that my rotating surfaces are in the form of thin disks, I am able to expose a greater extent of revolving surface within a given space than would be otherwise practicable.

Having now fully described my improved method of drying glue, with its several stages or features, what I claim as new, and desire to secure, is as follows:

1. Drying glue by wetting solid surfaces with the glue in a liquid state and allowing it to dry thereon in thin flakes, as herein specified.

2. Facilitating the drying of the glue in thin scales or flakes on solid surfaces by circulating air in contact therewith, as herein specified.

3. In the production of scale glue on solid surfaces, the employment of artificial heat within the solid surfaces or in the air, or both, as herein specified.

4. The mode of drying glue in thin scales by revolving or rotating surfaces, having their temperatures raised either by steam or hot air, substantially as described.

5. Drying glue on thin revolving disks, as and for the purposes herein set forth.

In testimony whereof I have hereunto set my name in the presence of two subscribing witnesses.

GEO. GUENTHER.

Witnesses:
JNO. DRESSLER,
CHS. STEINER.